United States Patent
Wagner

[11] 3,815,381
[45] June 11, 1974

[54] CONSTANT VELOCITY UNIVERSAL JOINT GAGE

[75] Inventor: Elmer R. Wagner, Bay City, Mich.

[73] Assignee: General Motors Corporation, Detroit, Mich.

[22] Filed: July 12, 1972

[21] Appl. No.: 270,983

[52] U.S. Cl. .................................. 64/21, 64/8
[51] Int. Cl. .................................. F16d 3/30
[58] Field of Search .................... 64/21, 8

[56] References Cited
UNITED STATES PATENTS
| | | | |
|---|---|---|---|
| 3,362,193 | 1/1918 | Ritsema | 64/21 |
| 3,464,232 | 9/1969 | Hutchinson | 64/21 |
| 3,656,318 | 4/1972 | Smith et al. | 64/21 |

Primary Examiner—Samuel Scott
Assistant Examiner—Randall Heald
Attorney, Agent, or Firm—F. J. Fodale

[57] ABSTRACT

Four embodiments of a cage having offset inner and outer partispherical control surfaces for locating the drive balls of a universal joint in the constant velocity plane are disclosed. Each of the four cages is designed to be manufactured by die forming a cylinder of uniform wall thickness — two cages being heavy wall construction and two cages being thin wall construction. In each of the four cages the offset inner and outer partispherical control surfaces are circumferentially located so that they overlap in an interposed relationship to minimize the length of the cage.

10 Claims, 10 Drawing Figures

PATENTED JUN 11 1974 3,815,381
SHEET 1 OF 2
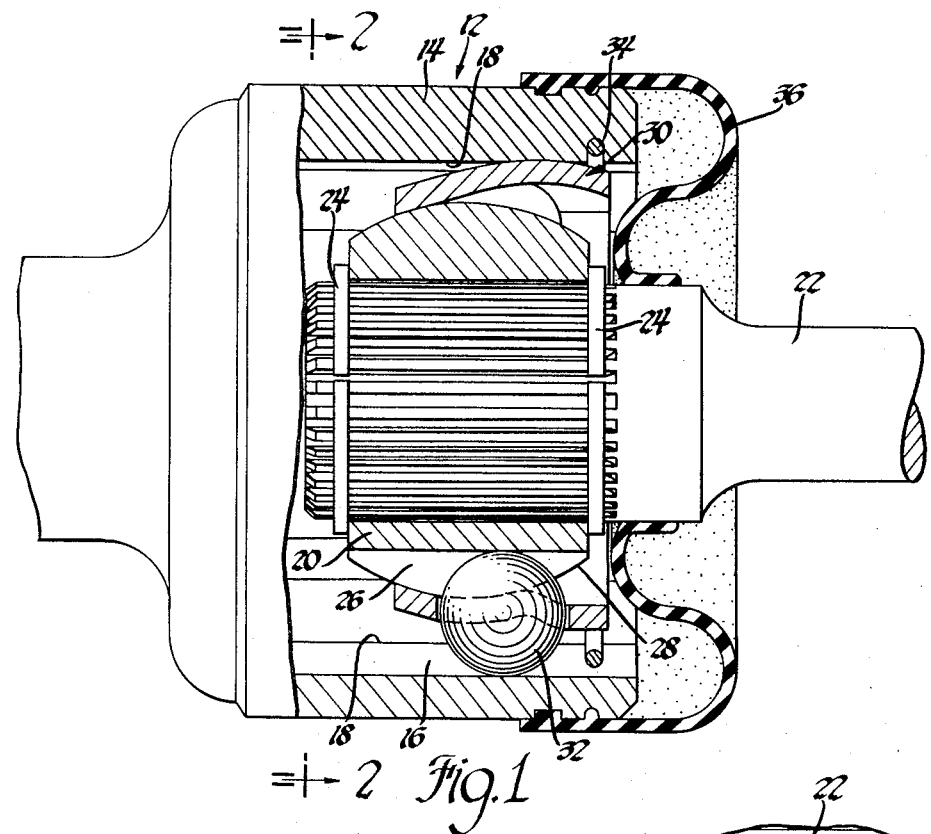
Fig.1
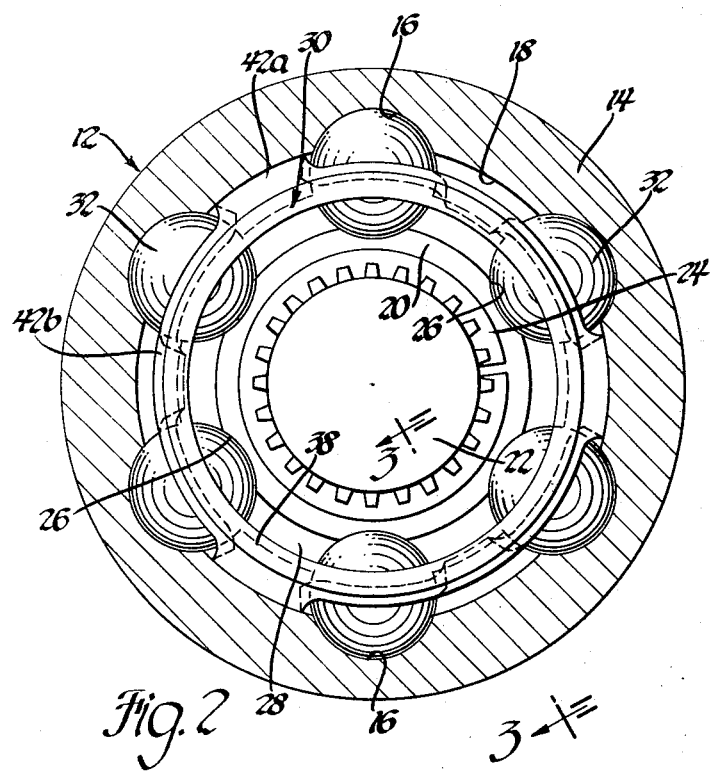
Fig.2
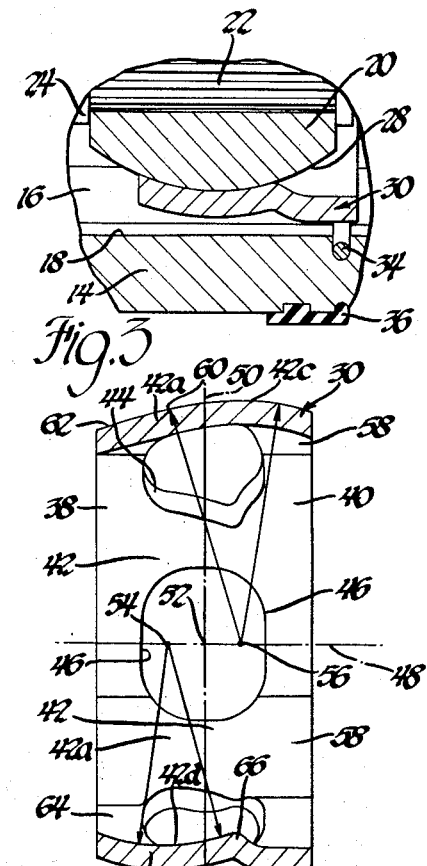
Fig.3
Fig.4

CONSTANT VELOCITY UNIVERSAL JOINT GAGE

This invention relates generally to constant velocity universal joints and more specifically to a cage for locating the drive balls of the universal joint in the constant velocity plane. Cages which locate the drive balls in the constant velocity plane and thereby allow the use of straight axial ball grooves in the joint inner and outer members are already known from the U.S. patent to Rzeppa, U.S. Pat. No. 2,046,584, which illustrates such a cage in FIG. 4. These cages require an inner partispherical control surface and an outer partispherical control surface offset in opposite directions from the cage center by an equal amount and have come to be known as "double offset" cages.

Such "double offset" cages are generally machined and thereby relatively expensive to manufacture because great quantities of metal must be removed to provide the proper contour for the cage. The initial stock even if tubular must be very thick in order to reach from the low point on the inner partispherical control surface to the high point on the outer partispherical control surface.

The U.S. Patent to Ritsema, U.S. Pat. No. 3,362,193, incidentally discloses what may be purported to be an improvement over the relatively expensive machined "double offset" cage. However, the cage 36 shown in the Ritsema patent even if die formed rather than machined suffers from a major drawback in that the inner partispherical control surface 52 and the outer partispherical control surface 50 are placed in an end-to-end relationship. This end-to-end relationship unnecessarily increases the length of the cage thereby offsetting the savings in maching with increased stock material, that is, a longer initial tube. Also when the cage is used in a telescoping joint such as that illustrated in the Ritsema patent, the elongated cage has the disadvantage of decreasing the stroking capabilities of the joint.

It is an object of my invention to provide an improved "double offset" cage for a universal joint which avoids the shortcomings of the cages referred to above.

Another object of my invention is to provide a "double offset" cage designed for manufacture which eliminates the necessity of removing great quantities of metal and the necessity of elongating the cage.

Another object of my invention is to provide a "double offset" cage having a length comparable to a machined cage yet designed for being in the main die formed from tubular stock.

Yet another object of my invention is to provide a "double offset" cage of minimum length which requires little or no machining.

Still another object of my invention is to provide a "double offset" cage which when die formed from tubular stock minimizes the amount of forming required.

Still yet another object of my invention is to provide a "double offset" cage for six or more drive balls which reduces the frictional heat generated in an operating universal joint using the cage.

Other objects and features of the invention will become apparent to those skilled in the art as the disclosure is made in the following detailed description of preferred embodiments of the invention as illustrated in the accompanying sheets of drawing in which:

FIG. 1 is an axial section of a telescoping constant velocity universal joint having a cage in accordance with my invention.

FIG. 2 is a section taken along the line 2—2 of FIG. 1.

FIG. 3 is a section taken along the line 3—3 of FIG. 2.

FIG. 4 is an axial section of the cage shown in FIG. 1.

Figure 5:
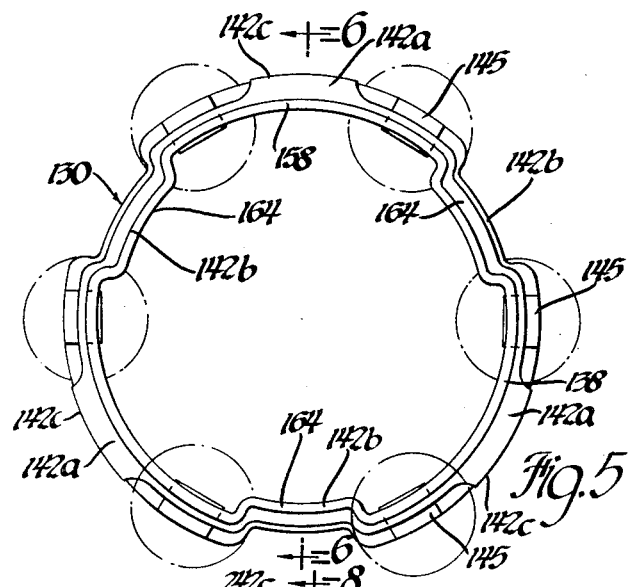
FIG. 5 is a front view of a second embodiment of a cage in accordance with my invention.

Referring now to the drawing, the telescoping constant velocity universal joint 12 illustrated in FIGS. 1 and 2 includes a hollow outer member 14 having six equally circumferentially spaced straight axial ball grooves 16 radiating from a cylindrical bore 18. Disposed within the hollow outer member 14 is an inner member 20 splined on to the end of a shaft 22 and located on the shaft end by snap rings 24. The inner member 20 also has six straight axial ball grooves 26 which are depressed from its outer partispherical surface 28. The inner member 20 is socketed for universal pivoting movement in a cage 30 which itself slides and pivots universally in the bore 18 of the outer member 14. Drive is transmitted between the outer member 14 and the inner member 20 by an array of balls 32 disposed in the ball grooves 16 and 26 which array is maintained coplanar by the cage 30. A circular snap ring 34 prevents separation of the cage 30 and the outer member 14 and a rubber boot 36 seals the opening between the outer member 14 and the shaft 22.

The principle of achieving constant velocity operation between the inner member 20 and the outer member 14 by locating the drive balls 32 at all joint angles in the homokinetic or constant velocity plane which is perpendicular to the plane defined by the axes of the inner and outer members and which bisects the angle formed by the axes of the inner and outer members is well known. It is equally well known from the U.S. Patent to Rzeppa, U.S. Pat. No. 2,046,584, FIG. 4, that the drive balls can be so located in the constant velocity plane by a cage having specific relationships to the inner and outer members which cage permits the use of simple straight axial ball grooves in the inner and outer members. Such a cage has come to be known as a "double offset" cage and my invention is directed to such a "double offset" cage.

While the "double offset" cage 30 is illustrated in connection with a telescoping type joint such as is shown in the U.S. Patent to Ritsema, U.S. Pat. No. 3,362,193, the principles of my invention are equally applicable to a fixed center or non-telescoping type joint such as is shown in FIG. 4 of the aforementioned Rzeppa patent with minor structural adjustments which are obvious in view of the only difference between the telescoping and non-telescoping joints being the configuration of the hollow outer member cavity. In the non-telescoping joint, this cavity is a concave partispherical socket in which the cage pivots universally. In the telescoping joint, the cavity is a cylinder in which the cage obviously slides as well as pivots universally.

The "double offset" cage 30 is of unitary construction die formed from tubular stock of uniform wall thickness. Particular forming steps and dies are not herein described as a number of alternate methods with appropriate dies will become readily apparent to a man having ordinary skill in such art from the following description of the cage 30.

Referring now to FIGS. 2 and 4, the elements of the cage 30 include the end rings 38 and 40 and the cross bars 42 which extend between the end rings and which together with the end rings define ball pockets 44. The width of the ball pockets 44 between the flat end faces 46 is such that the pockets 44 maintain the balls 32 centered axially in the pocket within manufacturing limits. The pockets 44, however, are slightly elongated in the circumferential direction since some slight relative circumferential movement between the balls 32 and the cage 30 occurs when the joint 12 is angulated and rotated. The plane perpendicular to the longitudinal axis 48 of the cage which bisects the width of the ball pockets 44 between the flat end faces 46 may be defined as the center plane 50 of the cage and the intersection of the plane 50 with the axis 48 of the cage may be defined as the center point 52 of the cage.

As is recognized in the aforementioned Rzeppa patent, the cage must universally pivot on the outer member 14 about a center 56 lying on the longitudinal axis 48 of the cage and offset from the center point 52 and must universally pivot on the inner member 20 about a center 54 lying on the longitudinal axis of the cage and offset in the opposite direction from the center point 52 by an equal amount.

The cage 30 incorporates this requirement in a unique manner to facilitate fabrication of the cage from tubular stock with die forming techniques by advantageous application of the fact that only three-point contact is required to locate one body radially with respect to another. A requirement of my invention is that the cage have at least six cross bars. The six cross bars 42 of the "double offset" cage 30 comprise two equally circumferentially spaced interposed sets of cross bars 42a and 42b. An axial section taken through one of the cross bars 42a is shown in the upper half of FIGS. 1 and 4 from which it is seen that the outer surface of the cross bar 42a has an outer partispherical control surface 42c generated from the center 56. The outer partispherical control surface 42c is continuous with a like outer partispherical surface on the region 58 of the end rings 40 aligned with the cross bar 42a and extends well past the center plane 50 of the cage where it merges smoothly with a conical surface 62 at the line of tangency 60.

Each of the three cross bars 42a have the same configuration with outer partispherical control surfaces generated from the common center 56 which are continuous with like surfaces on the end ring regions 58 and which merge with conical surface portions of the cross bars 42a and end ring 38. The radius of the outer partispherical control surfaces matches the radius of the bore 18 so that the cage 30 is universally pivotal in the bore 18 about the center 56 on the cage axis while the cage 30 is also slidable in the bore 18. The pivotal and sliding movement of the cage 30 is not limited in any way by the fact that the outer partispherical control surfaces 42c are on only three rather than all of the cross bars. It is in fact advantageous because less frictional heat is generated as the joint is angulated and rotated. The function of the conical surfaces 62 is to limit the angulation of the joint to a maximum angle. In cases where this is not necessarily desired, the partispherical control surfaces 42c could be continued past the line of tangency 60 to the end of the end ring 38. In the case of a non-telescoping joint such as is shown in FIG. 4 of the aforementioned Rzeppa patent, the conical surfaces 62 would necessarily be modified to a configuration which would not interfere with the cage pivoting in a partispherical socket.

An axial section taken through one of the cross bars 42b is shown in FIG. 3 and the lower half of FIG. 4 from which it is seen that the cross bar 42b has an inner partispherical control surface 42d generated from the center 54. The inner partispherical control surface 42d is continuous with a like inner partispherical surface on the region 64 of end ring 38 aligned with cross bar 42b and extends well over the center plane 50 to a bight 66 from which the cross bar 42b is connected to the end ring 40. Each of the cross bars 42b have a like configuration with inner partispherical control surfaces 42d generated from the common center 54. The radius of the inner partispherical control surfaces 42d matches that of the partispherical surface 28 on the inner member 20 so that the inner member 20 is socketed in the cage 30 and the cage 30 is thereby universally pivotal on the inner member 20. The universal pivotal movement therebetween is not in any way limited by the fact that the cross bars 42a have a different configuration. Thus by die forming the cage 30 into two distinct axial configurations, one in the areas containing three of the cross bars and the other in the areas containing three other cross bars, the cage 30 provides all of the structure necessary for a "double offset" cage. By placing portions of the inner and outer partispherical control surfaces on different cross bars, these surfaces can overlap in the center on the cage thereby minimizing the length of the cage which in the case of a telescoping joint increases the stroke capabilities of the joint. Moreover, less metal forming is required than if all of the cross bars were similarly configured so as to include both inner and outer partispherical control surfaces in an end-to-end relation.

The cage 30 has a substantially uniform thickness on the order of 0.165 inch. By substantially uniform thickness, it is meant that the inner and outer partispherical control surfaces are in the main die formed in a cylinder of uniform wall thickness without varying the thickness of any one portion to any great degree. Some minor metal removal for finishing may be required; however, this is a marked distinction from those "double offset" cages where great quantities of metal are removed from a basic cylinder having an initial uniform thickness extending from the low point on the inner partispherical control surface to the high point on the outer partispherical control surface.

Figure 6:
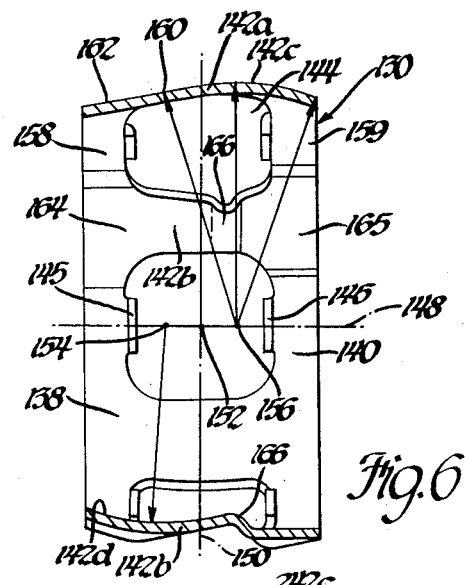
FIG. 6 is an axial section of the second embodiment of the cage taken along the line 6—6 of FIG. 5.

Referring now to FIGS. 5 and 6, a second embodiment in accordance with my invention is illustrated. The structural relationship between the "double offset" cage 130 and the other parts of a constant velocity universal joint are identical to that described in connection with the "double offset" cage 30. The cage 130 is also of unitary construction die formed from tubular stock, however, it is a much thinner cage having a thickness on the order of 0.058 inch. As before, appropriate die forming techniques will become apparent from the following structural description of the cage 130.

The cage 130 is generally annular having end rings 138 and 140 connected by six cross bars 142a and 142b which together with the end rings provide the ball pockets 144. Six inwardly bent tabs 145 on each of the end rings define the width of each of the ball pockets 144 which is bisected by the center plane 150 perpendicular to the cage longitudinal axis 148 at the cage center 152. The cage 130 has three circumferentially spaced H-shaped areas which include the end ring regions 158 and 159 on the end rings 138 and 140 respectively and the cross bars 142a. The axial section of the cross bar 142a is shown in the upper half of FIG. 6 from which it is seen that an outer partispherical control surface 142c extends from the right end of the cage 130 on the region 159 onto the cross bar 142a past the center plane 150 to the line of tangency 160. At the line of tangency 160, the outer partispherical control surface 142c merges smoothly with a conical surface 162 on the left end of the cross bars 142a and the entire outer surface of the regions 158. The three H-shaped areas are identical and each includes an outer partispherical control surface 142c generated from the common center 156 lying on the axis 148 offset from the cage center 152 and a conical surface 162 for limiting joint angle when desired.

The cage 130 has three circumferentially spaced I-shaped areas interposed with and depressed radially inwardly from the H-shaped areas. These I-shaped areas include the cross bars 142b and the regions 164 and 165 on the end rings 138 and 140 respectively. The regions 164 and 165 connect with the regions 158 and 159 with bights at the edges of the ball pockets 144 near the cross bars 142b.

An axial section through a cross bar 142b is shown in the lower half of FIG. 6. The cross bar 142 has a transverse bight 166 to the right of the center plane 150. An inner partispherical control surface 142d lying on the end ring region 164 and the majority of the cross bar 142b extends from the left end of the cage to the bight 166. Each of the three I-shaped areas are similarly configured with an inner partispherical control surface 142d generated from a common center 154 lying on the cage axis 148 offset from the cage center 152. The centers 154 and 156 are equally offset on opposite sides of the cage center 152 so that the cage 130 is also a "double offset" cage.

Figure 7:
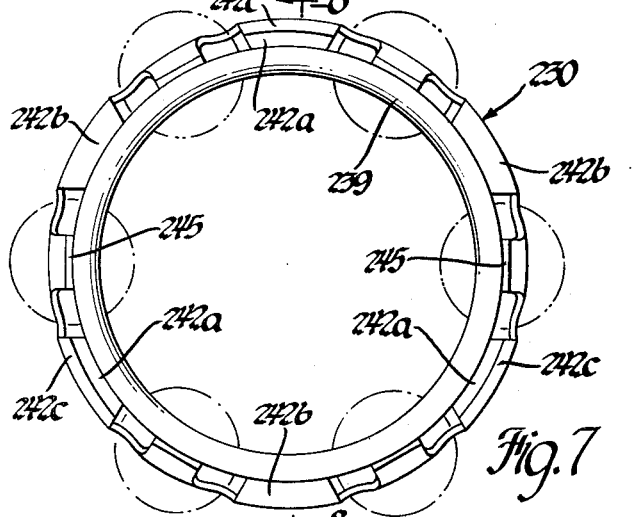
FIG. 7 is a front view of a third embodiment of a cage in accordance with my invention.
Figure 8:
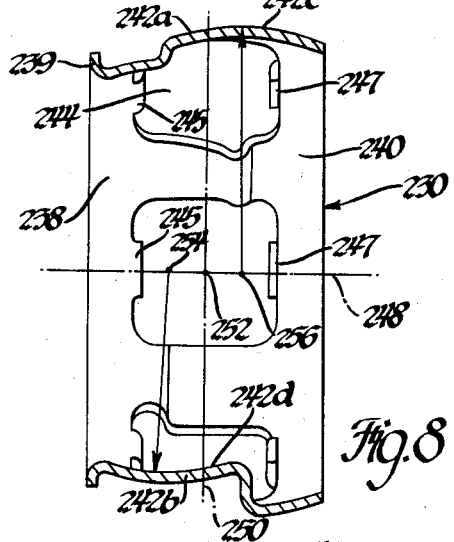
FIG. 8 is an axial section of the third embodiment of the cage taken along the line 8—8 of FIG. 7.

The cage 230 illustrated in FIGS. 7 and 8 is also a thinner cage of unitary construction die formed from tubular stock as the cage 230 has a substantially uniform thickness of 0.058 inch corresponding substantially to the initial thickness of the stock. In the cage 230, the end rings 238 and 240 connected by six cross bars 242a and 242b are uniform annuli. The end ring 238 has a stiffening flange 239 at its outside end and six outwardly extending tabs 245 at the inside end toward the ball pockets 244. The end ring 240 has six inwardly depending tabs 247. The tabs 245 and 247 define the width of the ball pockets 244. The center plane 250 bisecting the ball pockets 244 intersects the longitudinal axis 248 of the cage 230 at the center point 252.

From FIG. 8 it is seen that each of the cross bars 242a and 242b has a radially inward bend. The bend in the cross bars 242a occurs to the left of the center plane 250 and the cross bars 242a have outer partispherical control surfaces 242c generated from the center 256 offset to the right of the cage center point 252 on the cage axis 248. The outer control surfaces 242c continue onto a like surface on the uniform end ring 240. The bend in the cross bars 242b occurs to the right of the center plane 250 and the cross bars 242b have inner partispherical control surfaces 242d generated from the center 254 offset to the left of the cage center point 252. The inner partispherical control surfaces 242d continues onto a like partispherical surface on the uniform end ring 238. The offsets of the centers 254 and 256 are equal thus rendering the cage 230 a "double offset" cage. A feature of all of my cages, that is, the shortening of the cage due to control surface overlap is dramatized in the cage 230 by the cross bar bends. The central area of the cage between the bends on the cross bars 242a and 242b contains portions of both the three outer partispherical control surfaces 242c and the three inner partispherical control surfaces 242d thereby clearly illustrating that the surfaces overlap to reduce the length of the cage from an end-to-end configuration in which all of the bends would be aligned.

Regarding a limitation on the joint angle, it should be noted that the height of the stiffening flange 239 can be adjusted to either provide a limiting feature in those cases where it is desired or it can be limited so as to not interfere with a partispherical socket in the case of a non-telescoping joint.

Figure 9:
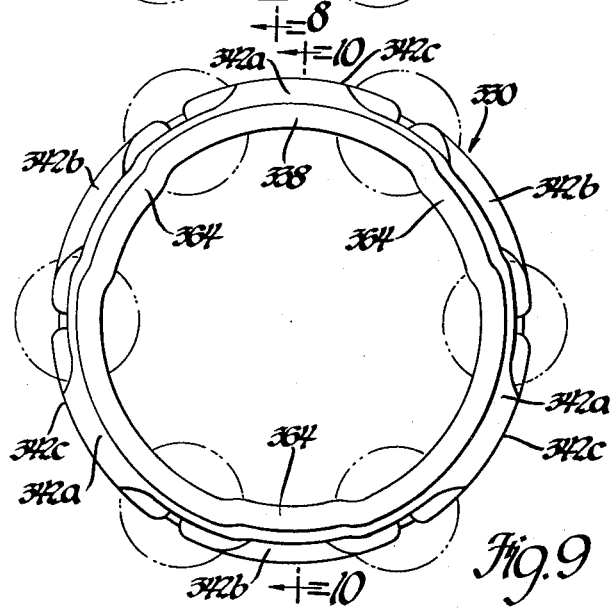
FIG. 9 is a front view of a fourth embodiment of a cage in accordance with my invention.
Figure 10:
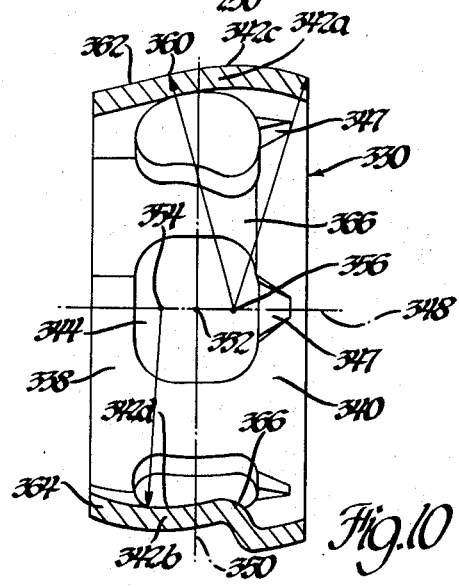
FIG. 10 is an axial section of the third embodiment of the cage taken along the line 10—10 of FIG. 9.

The cage 330 illustrated in FIGS. 9 and 10 is of heavier construction being die formed from tubular stock having an initial wall thickness on the order of 0.165 inch. The cage 330 has a substantially uniform end ring 340 with six struck dimples 347 at the edges of the ball pockets 344 for improved ball control. The outer partispherical surface of the end ring 340 is congruent with the outer partispherical control surfaces 342c on the three cross bars 342a as shown in the upper section in FIG. 10 through one of the cross bars 342a. The end ring 338 is for the most part substantially uniform except for three slightly depressed areas 364 which are aligned with the cross bars 342b. The cross bars 342b have bights 366 to the right of the cage center plane 350 as shown in the lower section in FIG. 10 through one of the cross bars 342b. Inner partispherical control surfaces 342d on the cross bars 342b extend from the bights 366 to the end ring 338 where they merge with like partispherical surfaces on the depressed areas 364. The inner and outer partispherical control surfaces 342c and 342d are respectively generated from the centers 356 and 354 located on the cage axis 348 at equal distances on opposite sides of the cage center point 352. The majority or non-depressed portions of the end ring 338 may have an angle limiting outer conical surface 362 which also lies only on a small portion of the cross bars 342a up to a line of tangency 360. As before the line of tangency 360 with the outer partispherical control surface 342c is well beyond the center plane 350 so that the partispherical control surfaces 342c and 342d overlap.

In each of the above four described embodiments of a "double offset" cage in accordance with my invention, the cage can in the main be fabricated by die forming a cylinder having a uniform wall with little or no metal removal required thereby greatly reducing the expense of manufacturing such cages in comparison to the machined type cage. In each of the cages, the inner and outer offset partispherical control surfaces overlap by placing at least a portion of those surfaces on different cross bars thereby maintaining the length of the cage comparable to that of the more expensive machined cage. The overlap feature also reduces the length of the cage from those die formed cages wherein the inner and outer control surfaces are in an end-to-end relation thereby effecting a saving in material and increasing the stroking capabilities of a telescoping universal joint when the cage is used in such a joint.

I wish it to be understood that I do not desire to be limited to the exact details of construction shown and described, for obvious modifications will occur to a person skilled in the art.

I claim:

1. A cage for maintaining a circumferential array of balls coplanar and positioning them in the homokinetic plane in a constant velocity universal joint, said cage having a longitudinal axis and comprising end rings connected by at least six circumferentially spaced cross bars defining ball receiving pockets bisected by a plane perpendicular to said longitudinal axis, the intersection of said plane with said longitudinal axis defining the center point of the cage, at least three of said cross bars having portions of substantially uniform thickness having outer partispherical surfaces and interior surfaces extending from one of said end rings through said plane to a location therebeyond, at least three other of said cross bars having portions of substantially uniform thickness having inner partispherical surfaces extending from the other of said end rings through said plane to a location therebeyond, said outer partispherical surfaces and said inner partispherical surfaces respectively having first and second common centers lying on said longitudinal axis on opposite sides of said center point and spaced equally therefrom, and said interior surfaces being spaced from an imaginary spherical surface defined by said inner partispherical surfaces having said second common center.

2. A cage for maintaining a circumferential array of balls coplanar and positioning them in the homokinetic plane in a constant velocity universal joint, said cage having a longitudinal axis and comprising end rings connected by at least six circumferentially spaced cross bars of substantially uniform thickness defining ball receiving pockets bisected by a plane perpendicular to said longitudinal axis, the intersection of said plane with said longitudinal axis defining the center point of the cage, a first set of cross bars having a first common axial configuration comprising at least three of said cross bars having outer partispherical surfaces, a second set of cross bars having a second axial configuration different from said first common axial configuration comprising at least three other of said cross bars having inner partispherical surfaces, said outer partispherical surfaces and said inner partispherical surfaces respectively having first and second common centers lying on said longitudinal axis on opposite sides of said center point and spaced equally therefrom, and said inner and outer partispherical surfaces having portions which overlap in an interposed relationship.

3. A cage for maintaining a circumferential array of balls coplanar and positioning them in the homokinetic plane in a constant velocity universal joint, said cage having a longitudinal axis and comprising end rings connected by first and second interposed sets of equally, circumferentially spaced cross bars defining ball receiving pockets bisected by a plane perpendicular to said longitudinal axis, the intersection of said plane with said longitudinal axis defining the center point of the cage, said first set comprising at least three cross bars of substantially uniform thickness having outer partispherical surfaces, said second set comprising at least three cross bars of substantially uniform thickness having portions which are depressed radially inward from axially corresponding portions on said first set, said last mentioned portions having inner partispherical surfaces, said outer partispherical surfaces and said inner partispherical surfaces respectively having first and second common centers lying on said longitudinal axis on opposite sides of said center point and spaced equally therefrom, and said inner and outer partispherical surfaces having portions which overlap in an interposed relationship.

4. A cage for maintaining a circumferential array of balls coplanar and positioning them in the homokinetic plane in a constant velocity universal joint, said cage having a longitudinal axis and comprising a first end ring and a second end ring connected by a first set of at least three equally circumferentially spaced cross bars and a second set of at least three equally circumferentially spaced cross bars interposed with said first set defining ball receiving pockets bisected by a plane perpendicular to said longitudinal axis and intersecting said longitudinal axis at a center point, said first set of cross bars having outer partispherical control surfaces on a majority of their length having a first common center lying on said longitudinal axis spaced to one side of said plane, said first end ring having at least portions of its exterior surface congruent with said outer partispherical control surfaces, said second set of cross bars having bights located on said one side of said plane and inner partispherical control surfaces extending from said bights to said second end ring, said inner partispherical control surfaces having a common center lying on said longitudinal axis spaced to the opposite side of said center plane, said second end ring having at least portions of its interior surface congruent with said inner partispherical control surfaces, and said first center and said common center being equally spaced from said center plane.

5. A cage for maintaining a circumferential array of balls coplanar and positioning them in the homokinetic plane in a constant velocity universal joint, said cage having a longitudinal axis and comprising
- a first end ring and a second end ring connected by a first set of at least three equally circumferentially spaced cross bars and a second set of at least three equally circumferentially spaced cross bars interposed with said first set defining ball receiving pockets bisected by a plane perpendicular to said longitudinal axis and intersecting said longitudinal axis at a center point.
- said first end ring comprising a substantially uniform annulus having an outer partispherical control surface having a first center lying on said longitudinal axis spaced to one side of said plane,
- said first set of cross bars having outer partispherical control surfaces on a majority of their length congruent with said outer partispherical control surfaces,
- said second set of cross bars having bights located on said one side of said center plane and inner partispherical control surfaces extending from said bights to said second end rings, said inner partispherical control surfaces having a common center lying on said longitudinal axis spaced to the opposite side of said center plane,
- said second end ring having at least portions of its interior surface congruent with said inner partispherical control surfaces, and
- said first center and said common center being equally spaced from said center plane.

6. The cage as defined in claim 5 wherein said first end ring has a plurality of inwardly depressed dimples located at the edge of said ball receiving pockets,
- wherein said second end ring has inwardly depressed areas aligned with said second set of cross bars, and
- wherein said portions of said interior surface of said second end ring congruent with said inner partispherical control surfaces lie only on said depressed areas.

7. The cage as defined in claim 5 wherein said first set of cross bars have bights located on said other side of said plane,
- wherein said outer partispherical control surfaces on said first set of cross bars extend to said bights,
- wherein said second end ring comprises a substantially uniform annulus having a radial stiffening flange, and
- wherein said first and second end rings have radial depending tabs at the edges of said ball receiving pockets.

8. A cage for maintaining a circumferential array of balls coplanar and positioning them in the homokinetic plane in a constant velocity universal joint, said cage having a longitudinal axis and comprising
- a first end ring and a second end ring connected by a first set of at least three equally circumferentially sapced cross bars and a second set of at least three equally circumferentially spaced cross bars interposed with said first set defining ball receiving pockets bisected by a plane perpendicular to said longitudinal axis and intersecting said longitudinal axis at a center point,
- said first end ring having a plurality of outer partispherical control surfaces aligned with said first set of cross bars and spaced by a plurality of depressed areas on said first end ring, said outer partispherical control surfaces having a first common center lying on said longitudinal axis spaced to one side of said plane,
- said first set of cross bars having outer partispherical control surfaces on a majority of their length congruent with said outer partispherical control surfaces,
- said second set of cross bars having bights located on said one side of said center plane and inner partispherical control surfaces having a common center lying on said longitudinal axis spaced to the opposite side of said center plane,
- said second end ring having at least portions of its interior surface congruent with said inner partispherical control surfaces, and
- said first center and said common center being equally spaced from said center plane.

9. The cage as defined in claim 8 wherein said plurality of depressed areas on said first end ring are aligned with said second set of cross bars,
- wherein said second end ring also has a plurality of depressed areas aligned with said second set of cross bars,
- wherein said portions of said interior surface of said second end ring congruent with said inner partispherical control surfaces lie only on the depressed areas thereon, and
- wherein said first and second end rings have radial depending tabs at the edges of said ball receiving pockets.

10. A cage for maintaining a circumferential array of balls coplanar and positioning them in the homokinetic plane in a constant velocity universal joint comprising
- an annular body of substantially uniform thickness throughout having end rings concentric to a longitudinal axis and connected by at least six circumferentially spaced cross bars defining ball receiving pockets bisected by a plane perpendicular to said longitudinal axis,
- said body having an outer partispherical surface and an inner partispherical surface respectively having first and second common centers, said common centers lying on said longitudinal axis and axially spaced from each other,
- said outer partispherical surface and said inner partispherical surface having portions overlapping in the axial direction, and
- said overlapping portions of said outer partispherical surface and said inner partispherical surface respectively being exclusively on mutually exclusive sets of cross bars, said mutually exclusive sets of cross bars each comprising at least three cross bars with the circumferential spacing between any two adjacent cross bars being less than 180°.

* * * * *

UNITED STATES PATENT OFFICE
CERTIFICATE OF CORRECTION

Patent No. 3,815,381                           Dated June 11, 1974

Inventor(s)  Elmer R. Wagner

It is certified that error appears in the above-identified patent and that said Letters Patent are hereby corrected as shown below:

Change the Title to read -- CONSTANT VELOCITY UNIVERSAL JOINT CAGE -- instead of "CONSTANT VELOCITY UNIVERSAL JOINT GAGE"

In the Specification:

Column 1, line 35, "maching" should read -- machining --.

Column 4, line 52, "cylinder" should read -- blank --, line 58, "basic cylinder" should read -- blank --.

Signed and sealed this 1st day of October 1974.

(SEAL)
Attest:

McCOY M. GIBSON JR.                C. MARSHALL DANN
Attesting Officer                  Commissioner of Patents